UNITED STATES PATENT OFFICE.

RICHARD HEINRICH DEUTSCHMANN, OF HAMBURG, GERMANY.

OBTAINING ANIMAL SERUM.

No. 914,644.          Specification of Letters Patent.          Patented March 9, 1909.

Application filed August 14, 1906. Serial No. 330,589. (Specimens.)

*To all whom it may concern:*

Be it known that I, RICHARD HEINRICH DEUTSCHMANN, a citizen of the German Empire, and resident of Hamburg, Germany, have invented certain new and useful Improvements Relating to Methods of Obtaining Animal Serum, of which the following is a specification.

This invention relates to an improved method of obtaining animal serum for medical purposes.

With the methods hitherto employed, animals were infected with the exciters of the disease against which the serum is intended to be used. For this purpose the animals received first injections of very small quantities of the disease-exciters, which quantities were gradually increased, until the animals were rendered immune against the poisonous serum, whereupon the blood was withdrawn from the animals. Out of this blood the serum was separated.

With my improved method, the animals are not infected at all with the disease-exciters, but are treated with ordinary innoxious or non-virulent yeast. The latter is given to the animals either together with the food or by injection of a serum which is taken from an animal which has undergone the yeast treatment in a satisfactory manner. The yeast is introduced into the animal system in gradually increasing doses, which depend upon the organism of the animal to be treated and upon the age, weight and ordinary food of such animal. In this way there are accumulated in the blood of the animal, substances active against human and animal diseases, *i. e.*, substances which effectively assist the organisms in their struggle against such diseases. The substances are contained within the serum in a concentrated form, so that an indifferent, polyvalent serum may thus be obtained from the blood of the animals treated.

I claim:

Method of obtaining animal serum, which consists in adding yeast to the food fed to an animal in a systematic manner until the curative serum is developed, and separating the serum from the blood of the animal, substantially as specified.

Signed by me at Hamburg this 25th day of July 1906.

RICHARD HEINRICH DEUTSCHMANN.

Witnesses:
    F. JULIUS POTHS,
    OTTO W. HELLMRICH.